United States Patent [19]
Johler

[11] Patent Number: 5,280,284
[45] Date of Patent: Jan. 18, 1994

[54] METHOD OF DETERMINING THE ELECTRICAL PROPERTIES OF THE EARTH BY PROCESSING ELECTROMAGNETIC SIGNALS PROPAGATED THROUGH THE EARTH FROM A CAPACITOR

[76] Inventor: J. Ralph Johler, 16796 W. 74th Pl., Golden, Colo. 80403-7916

[21] Appl. No.: 27,345
[22] Filed: Mar. 8, 1993

Related U.S. Application Data

[63] Continuation-in-part of Ser. No. 713,955, Jun. 11, 1991, Pat. No. 5,192,952.
[51] Int. Cl.$^5$ ............................................. G01S 13/04
[52] U.S. Cl. .................... 342/22; 342/189; 342/196; 342/191
[58] Field of Search ................... 342/22, 27, 195, 189, 342/190, 191, 192, 196; 324/323, 326, 327, 328, 332

[56] References Cited

U.S. PATENT DOCUMENTS

| | | | |
|---|---|---|---|
| 1,365,579 | 1/1921 | Appleby et al. | 342/367 |
| 2,077,707 | 4/1937 | Melton | 342/22 |
| 2,517,951 | 8/1950 | Wheeler | 342/22 X |
| 3,806,795 | 4/1974 | Morey | 342/227 |
| 3,831,173 | 8/1974 | Lerner | 342/22 |
| 3,967,282 | 6/1976 | Young et al. | 342/22 |
| 4,008,469 | 2/1977 | Chapman | 342/22 |
| 4,062,010 | 12/1977 | Young et al. | 342/22 |
| 4,126,860 | 11/1978 | Sullivan et al. | 342/22 X |
| 4,245,191 | 1/1981 | Schroeder | 342/22 X |
| 4,417,210 | 11/1983 | Rocroi et al. | 342/13 |
| 4,506,267 | 3/1985 | Harmuth | 342/744 |
| 4,651,152 | 3/1987 | Harmuth | 342/22 X |
| 4,746,867 | 5/1988 | Gunton | 342/22 X |
| 4,837,514 | 6/1989 | Spies | 324/336 |
| 4,905,008 | 2/1990 | Kawano et al. | 342/22 |
| 4,937,580 | 6/1990 | Wills | 342/22 |
| 5,051,748 | 9/1991 | Pichot et al. | 342/22 |
| 5,057,844 | 10/1991 | Rothstein | 342/51 |
| 5,113,192 | 5/1992 | Thomas | 342/22 |

OTHER PUBLICATIONS

J. R. Johler & J. D. Harper, Jr., "Reflection and Transmission of Radio Waves at a Continuously Stratified Plasma with Arbitrary Magnetic Induction," *Journal of Research,* vol. 66, No. 1, Jan.-Feb. 1962, pp. 81-99.
J. R. Johler, "Radio wave reflections at a continuously stratified plasma with collisions proportional to energy and arbitrary magnetic induction," reprinted from proceedings of the International Conference on The Ionosphere (held at Imperial College, London, Jul. 1962), *The Institute of Physics and the Physical Society,* 1963, pp. 436-445.
J. R. Johler, & J. D. Harper, Jr., "On the Effect of Solar Disturbances on the Low-Radio-Frequency Ionosphere Reflection Process," presented at the Symposium of the Ionospheric Research Committee (Naples, Italy), *Pergamon Press,* 1963, pp. 303-334.

*Primary Examiner*—John B. Sotomayor
*Attorney, Agent, or Firm*—Limbach & Limbach

[57] ABSTRACT

A method of processing electromagnetic signals which are injected into the earth from a capacitor and subsequently detected after reflection from subsurface layers, in order to determine the physical and electrical properties of those layers. The method is based on an iterative process which models the earth as a series of vertically stacked horizontal layers, each characterized by its physical properties of depth beneath the surface and thickness, and its electrical properties of resistivity (or conductivity) and relative dielectric constant. An initial propagation model which specifies the electrical properties of a particular layer or set of layers is constructed and applied to a model input pulse to produce a predicted return pulse which results from the reflection and/or transmission of the input pulse at the boundaries of the layer(s). The predicted return pulse is then compared to actual return pulse data which is selected so as to roughly correspond to a return pulse produced at the location of the modeled layer(s). The result of the comparison forms the basis for adaptively varying the parameters of the propagation model in a manner which is intended to increase the correlation between the predicted return pulse and the actual data. Repetition of the method for different layers or additional locations permits the electrical characteristics of the earth beneath a specified region to be determined. Knowledge of these characteristics can be used to infer the type of geologic formation responsible for transforming the input pulse into the received pulse.

13 Claims, 4 Drawing Sheets

METHOD OF DETERMINING THE ELECTRICAL PROPERTIES OF THE EARTH BY PROCESSING ELECTROMAGNETIC SIGNALS PROPAGATED THROUGH THE EARTH FROM A CAPACITOR

This is a continuation-in-part application of U.S. Pat. application Ser. No. 07/713,955, filed Jun. 11, 1991 now U.S. Pat. No. 5,192,952.

TECHNICAL FIELD

The present invention is generally directed to a method of determining the electrical properties of the earth as a function of depth and the frequency of a signal transmitted into the earth, and more specifically, to a method of processing electromagnetic signals which have propagated through the earth from a capacitor in order to determine such quantities, and thereby to infer the type of geologic formations beneath the earth's surface.

BACKGROUND OF THE INVENTION

Throughout the specification, the expressions "earth" and "earth formation" are used in a broad sense to denote any nonhomogeneous, dispersive medium having complex permittivity. Important examples of such media include subterranean formations such as soil, hardpan, and bedrock, and bodies of water (such as the ocean) above such subterranean formations.

Information regarding the electrical properties (e.g., resistivity, conductivity, relative permittivity) of a region of the earth can be used during geophysical exploration in order to assist with identifying the subterranean formations which may be encountered. Because of the correlation between different types of formations and their electrical properties, an appropriate sampling of data obtained from a region can be used to identify faults, mineral deposits, and the geoelectric structure of the rock bedding beneath the surface. One means of determining these electrical properties is by transmitting an electromagnetic signal downward into the earth and then processing the return signal which is received after reflection from one or more layers within the earth, where each layer is associated with a set of electrical properties.

A "Method and Apparatus for Transmitting Electromagnetic Signals into the Earth from a Capacitor" is described in allowed U.S. Pat. application Ser. No. 07/713,955, filed Jun. 11, 1991, which is the parent application of the present continuation-in-part application, and which is hereby incorporated by reference. The parent application teaches the use of a capacitor to transmit a pulse of electromagnetic radiation having a broad frequency band downward into the earth. The inhomogeneous, dispersive nature of the earth causes the pulse to be partially transmitted and reflected at different depths or layers. This results in a return signal being propagated back upward which can be detected by a similar capacitor.

The processing of the return signal permits the electrical characteristics (such as the relative dielectric constant and complex resistivity) of the earth as a function of depth and the frequency components of the transmitted pulse to be determined. These characteristics can then be correlated to specific types of subsurface formations in order to image the subsurface region. Information about the subsurface formations may then be used to assist with geophysical exploration.

Of background relevance to the present invention are mentioned methods for modeling the propagation of radio waves in the ionosphere to determine the values of the complex indices of refraction for multiple, stratified layers in the propagation medium. For example, the article by J. Ralph Johler (the inventor of the invention described in the present application) entitled "Radio wave reflections at a continuously stratified plasma with collisions proportional to energy and arbitrary magnetic induction", contained in the *Proceedings of the International Conference on The Ionosphere held at Imperial College London July* 1962, pp. 436–445, published by The Institute of Physics and the Physical Society, and the articles by J. Ralph Johler and John D. Harper, Jr. entitled "Reflection and Transmission of Radio Waves at a Continuously Stratified Plasma With Arbitrary Magnetic Induction", Journal of Research of the National Bureau of Standards, Vol. 66, No. 1, January–February 1962, pp. 81–99, and "On the Effect of Solar Disturbances on the Low-Frequency Ionosphere Reflection Process", contained in *The Effect of Disturbances of Solar Origin on Communications*, pp. 303–334, G. J. Gassmann editor, published by Pergamon Press, 1963, which are hereby incorporated by reference, discuss a model of the ionosphere which consists of a series of stacked layers of plasma, with each layer being characterized by a complex index of refraction. The propagation of a plane wave through this medium can be modeled according to the methods described in these references and the predicted electron density and collision frequency profiles can be compared to actual measurements as a means of validating the model.

However, the prior art does not teach or suggest how to model the propagation of an electromagnetic signal through the earth to determine electrical properties of interest to geophysical exploration, and does not teach or suggest how to determine such properties in an efficient, iterative manner.

SUMMARY OF THE INVENTION

The present invention is directed to a method of processing electromagnetic signals which have propagated through a layered subterranean formation after having been injected into the earth from a capacitor, in order to determine physical and electrical properties of the subterranean formation.

The method is an iterative process and is based on modeling the earth as a series of vertically stacked horizontal layers, each characterized by its physical properties of depth beneath the surface and thickness, and its electrical properties of complex resistivity (or conductivity) and relative dielectric constant. An initial propagation model which specifies the physical and electrical properties of a particular layer or set of layers is constructed. The propagation model is applied to a model input signal to produce a predicted return signal which results from the reflection and/or transmission of the input signal at the boundaries of the layer(s), and whose form is determined by the impact of the electrical characteristics of the modeled layer(s) on the input signal. The predicted return signal is then compared to (correlated with) actual observed return signal data which is selected so as to roughly correspond to a return signal produced at the location of the modeled layer(s). The result of the comparison forms the basis for adaptively varying the parameters of the propagation model in a manner which is intended to increase the correlation between the predicted return signal and the actual data.

When a desired degree of correlation is achieved, the parameters of the propagation model are interpreted as representing the actual electrical and physical characteristics as a function of depth and frequency of a geoelectric column at the location of the injected signal, i.e., the resistivity and dielectric properties of a sequence of vertical layers whose boundaries are determined by the variations in the electrical properties of the layers. In principle, a geoelectric column represents a local vertical variation of these properties at a particular location. Repetition of the method for different layers or additional locations thus permits the electrical characteristics of the earth beneath a specified region to be determined. Knowledge of these characteristics can then be used to infer the type of geologic formation responsible for transforming the input signal into the received data.

DETAILED DESCRIPTION OF THE PREFERRED EMBODIMENT

FIGS. 1a through 1d show several embodiments of capacitor terminal pairs suitable for use in transmitting or receiving signals which are to be processed according to the method of the present invention. Each capacitor terminal pair depicted in FIG. 1 includes a set of terminals which permit an electrical pulse of energy to be injected into the earth or a return signal corresponding to that pulse to be received (after having propagated through the earth).

Figure 1A:
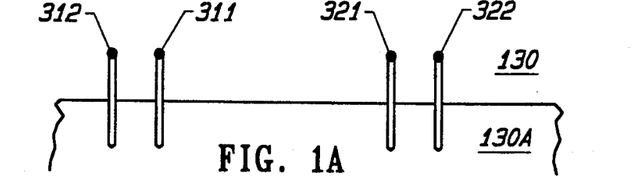
FIGS. 1a, 1b, 1c, and 1d show several embodiments of capacitor terminal pairs suitable for use in transmitting or receiving signals which are to be processed according to the method of the present invention.

The simplest set of terminals, shown in FIG. 1a, includes transmitted pulse input terminals 311 and 312 received pulse terminals 321 and 322. Terminals 311, 312, 321, and 322 comprise metallic pins or electrodes driven into the earth, either partly or completely beneath the earth's surface 130. If a high voltage electrical pulse is applied to transmitting terminals 311 and 312, a return pulse can be detected at receiving terminals 321 and 322 after having propagated through the earth. The nature of the received signal will in large measure be dependent upon the electrical characteristics of the earth 130a.

Figure 1B:
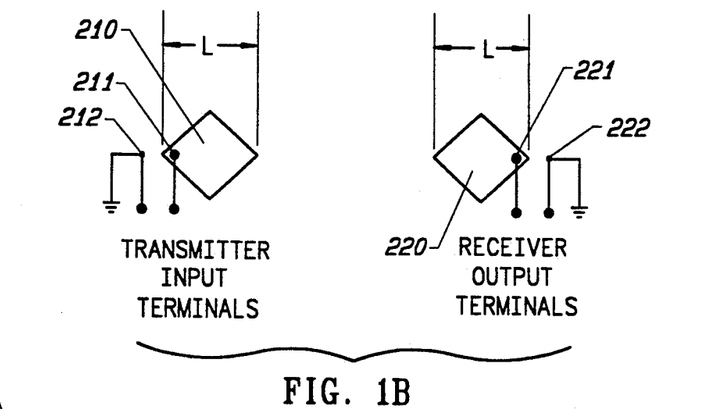

A more convenient and effective apparatus for injecting pulse energy into the earth 130a is depicted in FIG. 1b, which shows a transmitting device and a receiving device which each include a metal plate, 210 or 220, with greatest dimension, L and a single metallic pin or electrode. The input terminals consist of a terminal 211 or 221 on each plate 210 or 220, and a terminal on the pin that has been driven into the earth, 212 or 222. Here an electrical pulse applied to the transmitter terminals, 211 and 212 will produce an earth response at the receiver terminals, 221 and 222. This earth response can be observed and recorded.

Figure 1C:
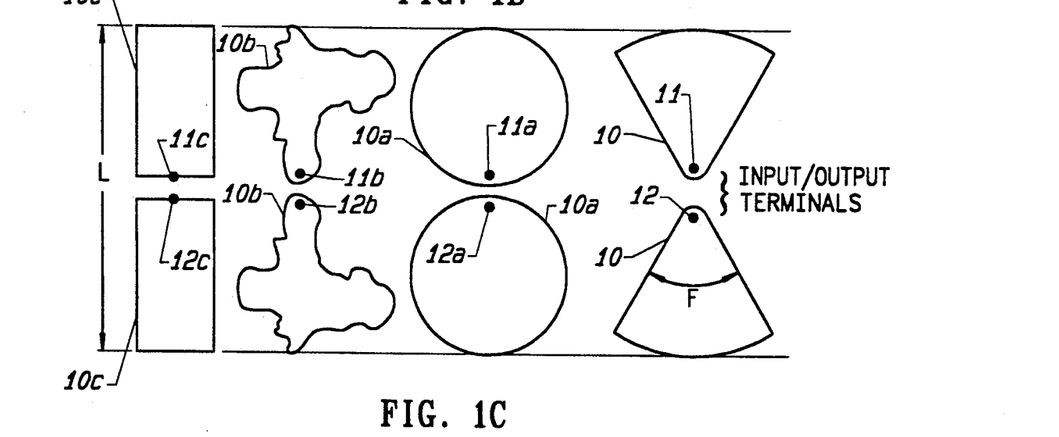
Figure 1D:
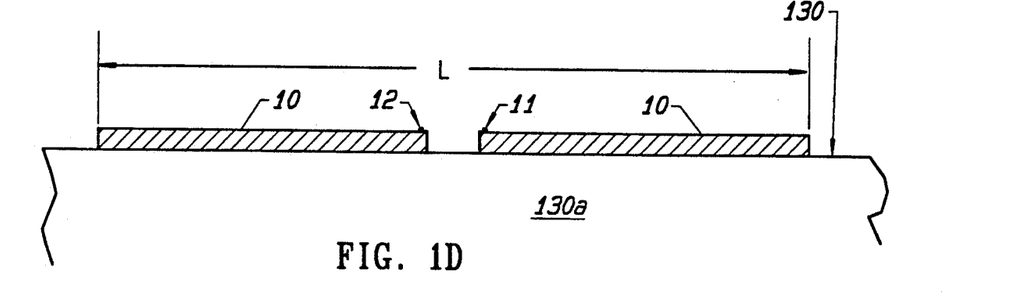

Earth pulse excitation terminals which are balanced with respect to the ground in such a manner as to be more convenient and more efficient than those shown in FIGS. 1a and 1b, are shown in FIG. 1c. Here metallic plates 10, 10a, 10b, and 10c are shown with terminals 11, 11a, 11b, and 11c respectively, and terminals 12, 12a, 12b, and 12c respectively. The greatest dimension of each plate pair is designated by L, and the flare angle of plate 10 is designated by F. A cross section representative of each of plates 10, 10a, 10b, and 10c is shown in FIG. 1d. Here plate 10 for example, is shown firmly placed on the earth, 130a at the earth's surface 130. Terminals 11 and 12, which may be for either input or output together with the greatest dimension, L, are shown. Such a configuration is termed an earth capacitor if the critical dimension L and the area of the plates are selected so that the input terminals exhibit resistive and capacitive impedance components within the desired frequency regime described in the parent application.

Figure 2:
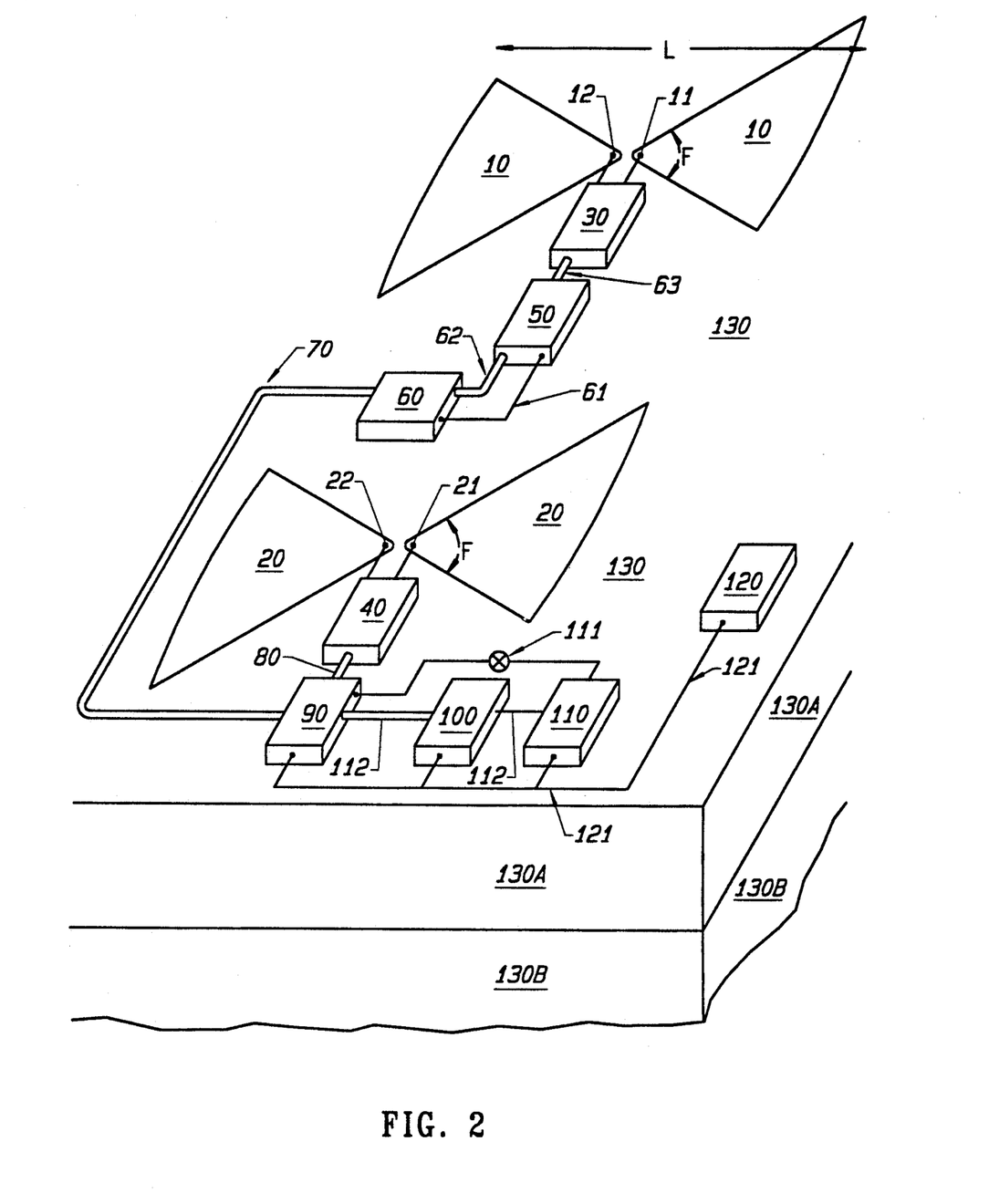
FIG. 2 is a perspective view of an apparatus for the generation and application of signals to the terminals of an earth capacitor, and for receiving return signals which have propagated through the earth.

FIG. 2 depicts a perspective view of an application of the earth capacitor apparatus of FIG. 1 which is described more fully in the above-referenced parent application. Metallic plates 10 and 20 of copper or brass shaped as flat circular sections of overall length L and flare angle F are snugly placed on the surface of the earth 130. Plates 10 and 20 may or may not be coated with one to two millimeters of plastic for protection. Typical values for L and F are 0.5 meters and 90 degrees, respectively. The apex from which the flare radiates contains an insulated gap across which two terminals, 11 and 12 or 21 and 22, are arranged.

Terminals 11 and 12 or 21 and 22 are balanced electrically with respect to the earth and this balance is maintained with the aid of a transmission line balun (balanced to unbalanced transmission line transformation) 30 or 40. Thus, pulse generator 50, if capacitor apparatus 10 and 30 is to be used as a transmitter, or amplifier 90, if capacitor apparatus 20 and 40 is to be used as a receiver are unbalanced to the ground and a suitable unbalanced-to-balanced transformation must be made to the apex points, 11 and 12 or 21 and 22 With balun 30 or 40. This describes the elements of the capacitor apparatus: two metallic plates and a "dielectric" or earth in contact with and common to both sets of plates.

Since the permittivity and/or the conductivity of the material with which the plates are in contact may be, and indeed usually is a complex quantity, and more importantly, since radiation is lost into the earth, the configuration presents both capacitive and resistive components to the input impedance at the apex points where the transmission line balun is connected. The earth 130 has thus been placed in an electrical circuit with pulse generator 50, which typically operates at an impedance level of 50 ohms with respect to short cable connection 63. Elements 10, 30, 50, and 63 are capable of coupling extremely high voltage pulses into the earth although low voltage pulses, of the order of 300 to 2500 volts, have been found to be generally useful in earth subsurface applications.

The scheme depicted in FIG. 2 can be used for probing the electrical properties of subterranean earth formations. This is best accomplished by injecting high energy pulses into the earth and detecting the resulting return pulses that have propagated through the earth.

The pulses are timed by oscillator or timer 60 which is supplied with power through cable 70 via oscilloscope, digitizer and amplifier apparatus 90. A synchronizing pulse is transmitted to pulse generator 50 over cable 62 while power cable 61 powers the pulser. DC power supply 110 provides power from a remote location with respect to capacitor apparatus 10 or 20.

Switch 111 is used to shut off the pulser while at the same time maintaining the synchronizing signal for purposes of noise sampling of the return signal environment. The synchronizing pulse or signal is supplied to oscilloscope and digitizing apparatus 90 via cable 70. Thus cable 70 carries DC power and synchronizing pulse together with on/off information for the pulser. The pulse signal is injected into the earth 130 via plates 10 in time synchronization from pulser 50. The separation between transmitting apparatus 10, 30, and 50, and the receiving apparatus 20, 40, and 90 may vary from about 6 to 100 meters, although a separation of 6 meters has been used most extensively by the inventor up to this date. The preferred design and method of operation of the FIG. 2 apparatus, to obtain return pulses that have propagated from a desired subterranean depth, are described in the parent application.

The pulse wavelets returning from the depths of the ground are collected in various time windows opened in time relative to the synchronization pulse. Returning pulses are digitized by digitizing apparatus 90 and processed through computer and recording apparatus 100. The data in digital form is then stored on floppy disks (or other suitable medium) for permanent storage and future processing. Most of the equipment can be conveniently located in a motor vehicle and AC power can be supplied by a small portable alternator 120.

In accordance With the present invention, the processing of the data stored on the floppy disks is described with reference to FIG. 3, which is a block diagram of the processing scheme of the present invention and which is used to model the physical and electrical properties of the earth. The unit of time, t, over the observed waveform is fundamentally the second. However, very short times of the order of several thousand nanoseconds (ns, where 1 ns equals $1 \times 10^{-9}$ seconds) are relevant when discussing the time scale of the method of the present invention. This time scale is largely a consequence of the constant, $c = 0.299792458$ meters per nanosecond, the so called "speed of light".

The observed time domain data is usually stored in overlapping time windows such as 0–10000 ns, 2000–12000 ns, 5000–15000 ns, 10000–20000 ns, etc. It has been found that each of these time regimes correspond to a depth regime (in feet for example) relative to sea level. The relationship, however is not linear because the electrical properties of the ground vary with both depth and frequency, and in particular with the type of rock formation or "stratum" encountered by the electrical pulse.

Figure 3:
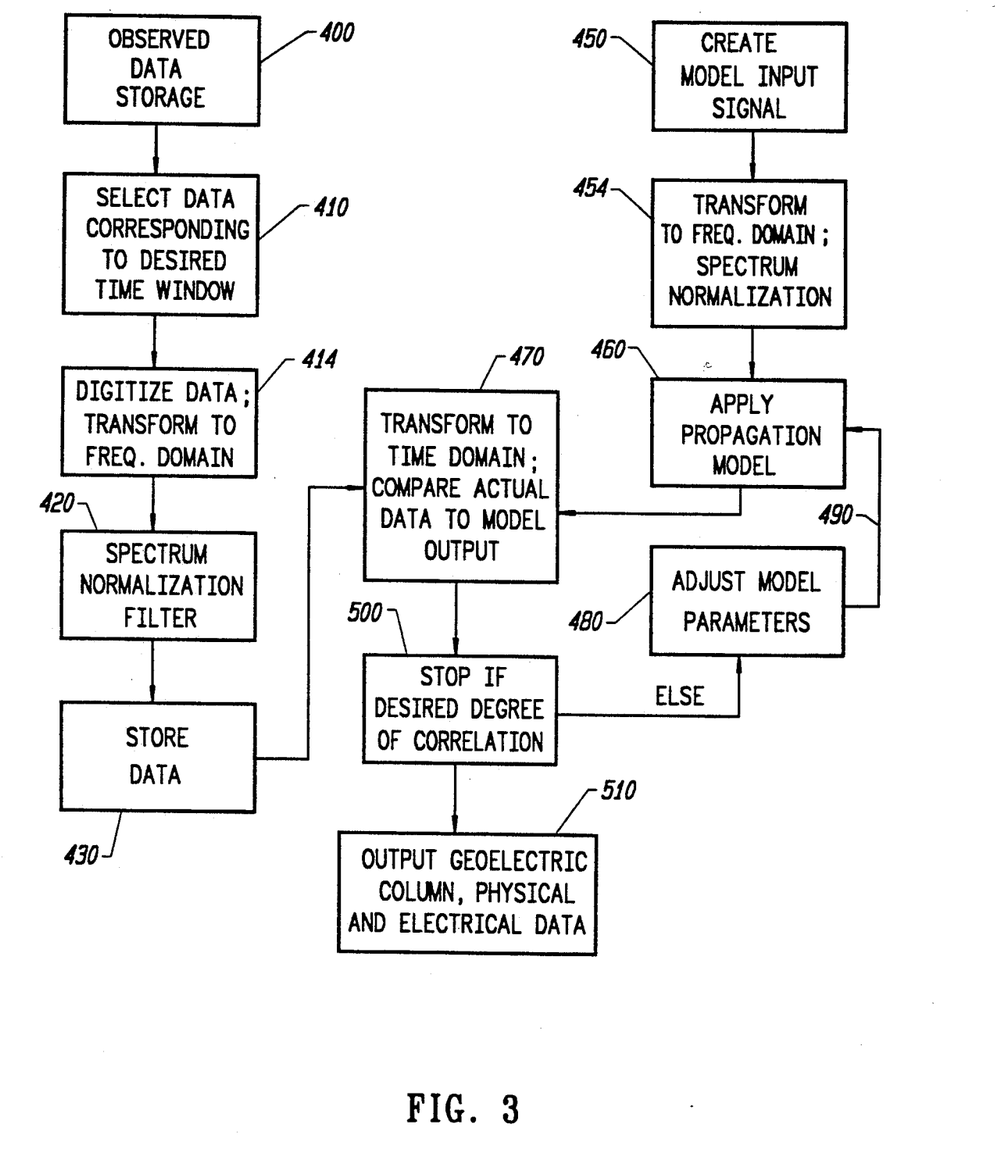
FIG. 3 is a block diagram of the processing scheme of the present invention which is used to model the physical and electrical properties of the earth.

With reference to FIG. 3, the observed data (for a return pulse) is initially stored in observed data storage 400. A portion of the stored data which corresponds to a desired time window (and hence an approximately known depth regime) is then selected (as indicated by box 410). This actual received pulse data will ultimately be compared to the received pulse predicted by a propagation model so that, in accordance with the method of the present invention, the electrical properties of the earth layer which corresponds to the depth regime may be determined.

The observed time domain data corresponding to the selected time window is then replicated, i.e., put into a mathematical form that represents the actual observed data to a desired degree of accuracy. This may be accomplished for example, by digitization and then transformation to the frequency domain by means of a Fourier transformation (step 414), followed by further data manipulations such as filtering or deconvolution which serve to put the observed data into a useful form. For instance, the digitized and transformed data may be subjected to a spectrum normalization filter 420 (similar to a deconvolution operation), which insures that the various components of the spectrum in the frequency range corresponding to the selected time window are given substantially the same weight so that a single line spectrum does not dominate the window. The data may also be subjected to a filter which limits the range of frequency components being used in later steps of the method. After spectrum normalization (step 420) and/or any other desired manipulations, the data is stored (step 430) and in this form becomes a constant of the process.

The next stages of the method produce simulated received data which will be compared to the data stored in a storage device during step 430. Data manipulations of the simulated received data are generally performed in the frequency domain where the data may be subjected to similar filtering and/or deconvolution operations as those performed on the actual observed data after its transformation to the frequency domain. After the received data has been produced by the model and undergone any desired manipulations, both the actual data and the simulated received data are transformed back to the time domain where they are compared to assess whether further changes to the model's parameters are required.

The production of simulated received data begins, if desired, by selection of a model input signal as shown in box 450. The input signal may be represented by a delta function (for an impulse function), a square wave, or other desired form. It is also possible to simply let the model run through its iterations without specifying the form of the input signal. However, for operation on a portable computer, it is more efficient to begin with a defined input signal. The frequency domain spectrum of a model time domain waveform may be obtained by application of a Fourier transform (step 454). The spectrum of the input signal may then be restricted and modified by digital filtering and/or spectrum normalization as was discussed above with reference to the manipulation of the observed data (also step 454). A physical model of the propagation of an input signal through the earth is then applied to the frequency domain representation of the input signal, as indicated by box 460.

The propagation model is based upon Maxwell's equations and is introduced to describe the propagation of the frequency domain representation of the input signal downward through a layer or vertically stacked horizontal layers of the earth and then back upward to the surface by virtue of reflections occurring at the boundary between different horizontal layers. The model can be made more accurate by introducing a representation of the input signal (which may be based on a model of the source producing the signal) and modeling the coupling mechanism of the signal into the ground. The actual received pulse waveforms in the selected time window, after having been transformed to the frequency domain, undergoing desired manipulations and then being stored (step 430), are transformed back to the time domain and then compared with the result of transforming to the time domain the result of applying the propagation model to the frequency representation of the model input signal, and the degree of correlation between the two sets of data is determined (step 470).

Based on the result of the comparison step, the modeling process is either stopped (box 500), or if the degree of correlation is not equal to that desired, a basic parameter adjustment of the model is performed (box 480). The modified propagation model is then applied to the model input signal (in a second iteration of step 460), followed by another transformation to the time domain and comparison step (a second iteration of step 470). This cycle is repeated until the maximum or desired degree of correlation is achieved. When this has occurred, the final output is the most recently modified model, which comprises a geoelectric column for the particular locality together with the basic electrical parameters of the iteration. These parameters are the complex resistivity and dielectric property of each of the horizontal layers assumed by the model, together with the thickness of each layer. The resistivity versus depth and frequency, and the dielectric property versus depth and frequency of the earth formation are determined by the corresponding parameters used in the propagation model in order to obtain the desired degree of correlation.

Since the propagation model models the earth as a sequence of vertically stacked horizontal layers, each characterized by a set of electrical and physical parameters, and since the model responds only to upward and downward traveling waves, iterations of steps 460, 470, and 480 of the FIG. 3 method in effect comprise a filter that removes the non-vertically traveling waves. This is largely possible since vertically traveling waves are usually dominant in the selected frequency window. The iteration loop (including loop portion 490) may therefore be referred to as a filter loop.

In understanding the invention, it is helpful to appreciate that the propagation of electromagnetic signals in the earth is much more complicated than in the atmosphere. When an electromagnetic pulse is coupled to the earth, return pulses from depths greater than a few hundred feet in the earth seem to vanish. However, the inventor of the present invention has recognized that the earth supports pulse propagation through much longer distances, and in all types of subterranean formations. Usually, pulse dispersion occurs with the result that the frequency window of a return pulse is shifted to a lower frequency regime relative to the frequency window of the originally transmitted pulse. Accordingly, unless observations are made in the proper frequency window, an observer may incorrectly conclude that a return pulse has been lost in the noise.

The inventor has recognized that it is usually irrelevant to detect and process a return signal in the same frequency window as that of a transmitted signal, and in fact in a preferred embodiment, the voltage pulse applied to the transmitting capacitor has frequency components in a broad band from below 1 MHz to above 100 MHz, and the frequency components of the detected electromagnetic radiation that are processed to image the subsurface have a frequency in the range from about 500 KHz to 25 MHz.

The iterative cycling which has been described with reference to FIG. 3 is continued until the correlation between the observed and predicted time domain waveforms corresponding to the particular time window is maximized or reaches a desired value, usually of the order of 70% to 95%. For greater accuracy the stratification, i.e., the number of layers specified in the model applied in each iteration of step 460 can be increased indefinitely. This is particularly desirable when sufficient computing resources are available, as such an approach allows the propagation medium to be modeled as a continuum. After performance of step 500 (see FIG. 3), exploration of other depth regimes (time windows) can then be undertaken by again performing all steps of the method to process another set of data (selected during another step 410) until a complete geoelectric column is obtained. A sequence of such geoelectric columns over an area can then be used to indicate the nature of the subsurface geology from an electrical point of view, and can be used to assist in identifying faults, special mineral deposits, and the geoelectric structure of the rock bedding.

The remaining portions of this specification will be devoted to providing a more detailed description of the structure of the propagation model and the operation of the parameter adjustment loop depicted in FIG. 3. The development of the earth capacitor concept described in this and its parent application is based upon extensive observations by the inventor and others over a variety of geographical locations in Wyoming, Colorado, New Mexico and Texas. In these observations it became apparent that the various waveforms observed and recorded via the reception recorder were a consequence of the electrical pulse excitation of the input pulse and the corresponding response of the earth from the various depths, where the response depended on the electrical properties of subterranean geologic formations. It was further observed that the earth response comprised pulse wavelets traveling primarily in the direction perpendicular to the various earth formations or essentially comprised a system of waves, or in the cases of pulses, comprised a system of pulse wavelets traveling upward and downward through the various geologic formations.

The mathematical construction which will be described applies the notion of stratification but is sufficiently simple as to be handled on a modern personal computer (PC), yet sufficiently complex to be capable of yielding a practical level of accuracy when characterizing the geoelectric column at a surface point location in a subsurface survey. It is believed that characterization of geoelectric structure to depths of the order of 20000 feet or greater may be possible using this method of analysis. It should be obvious that the model applied during any repetition of step 460 can be improved in its degree of sophistication and rigor as greater computing power becomes available.

Each frequency domain component of the downward traveling signal resulting from the application of an electrical pulse to the terminals of an earth capacitor, having a particular frequency f (in Hertz), at a distance D (in meters) below the horizontal location of the capacitor terminal, can be described by the mathematical form:

$$E(\omega,D) = E(\omega,D)\ exp(\omega\beta D/c)exp(i\omega t - i\omega D/V_c), \quad (1)$$
where $\beta$ is the attenuation factor, $V_c$ is the phase velocity, f is the frequency in Hertz, and $\omega=2\pi f$. The phase velocity $V_c$ is equal to $c/\alpha$, where $\alpha$ is the real part of the complex index of refraction.

For the purposes of the present invention, the fundamental electrical parameters for a vertically stacked horizontal layer of the earth which is characterized by the index k, are given by:

$\epsilon_k$ = the relative dielectric property (permittivity) of the kth layer;
$\rho_k$ = the resistivity in ohm-meters of the kth layer; and
$\sigma_k$ = the conductivity in mhos per meter of the kth layer.

With the above definitions, the attenuation factor $\beta$ and the quantity $\alpha$ can be further defined as:

$$\beta = A \sin(\Theta) \text{ and } \alpha = A \cos(\Theta), \text{ where} \quad (2)$$

$$A = [\epsilon_k^2 + (\sigma_k/(\epsilon_0\omega))^2]^{\frac{1}{2}} \text{ and} \quad (3)$$

$$\Theta = 0.5 * \tan^{-1}(-\sigma_k/\epsilon_0\epsilon_k\omega). \quad (4)$$

Here $\epsilon_0 = 1/(c^2\mu_0)$ where c equals the speed of light in vacuum and $\mu_0$ is the permeability in vacuum and has a value of $4\pi \times 10^{-7}$ henry per meter. The complex index of refraction for the kth layer is given by $\eta_k$, where $\eta_k = \alpha_k + i\beta_k$. By way of example, for air $\eta_k = 1.000338$, while for a vacuum $\eta_k = 1.0$.

The method of the present invention uses a transformation between the time and frequency domains (a Fourier Transform-Integral) which is described by:

$$E(t,D) = (1/2\pi) \cdot \quad (5)$$

$$\int_{-\infty}^{+\infty} \exp(i\omega t) E(\omega,D) f_r(\omega) \int_0^\infty \exp(-i\omega\tau) F_S(\tau) \, d\tau \, d\omega,$$

where $E(t,D)$, the time domain representation, is dependent on the inner integral which in turn depends on the form of a pulse $F_S$ which is transformed to the frequency domain, and then multiplied by the transform of the propagation medium and other appropriate quantities. In equation (5), D is the distance into the earth in meters, and the local time t and universal time $\tau$ are related by:

$$t = \tau - \alpha_k D/c. \quad (6)$$

The quantity $F_S$ can be thought of as the current in the transmitting capacitor dielectric, that is the current about the capacitor plates in the topmost layer of the non-homogeneous earth as a function of time. The quantity $f_r$ represents the frequency dependence of the earth capacitor when acting as a transmission device into the earth or as a receiving device for pulse energy emerging from the earth. The nature of $F_S$ and $f_r$ have been determined experimentally and can be inferred from application of the method of the present invention to real earth pulse response data. Possible representations of $F_S$ and $f_r$ will be presented later in this application.

Figures 4A, 4B:
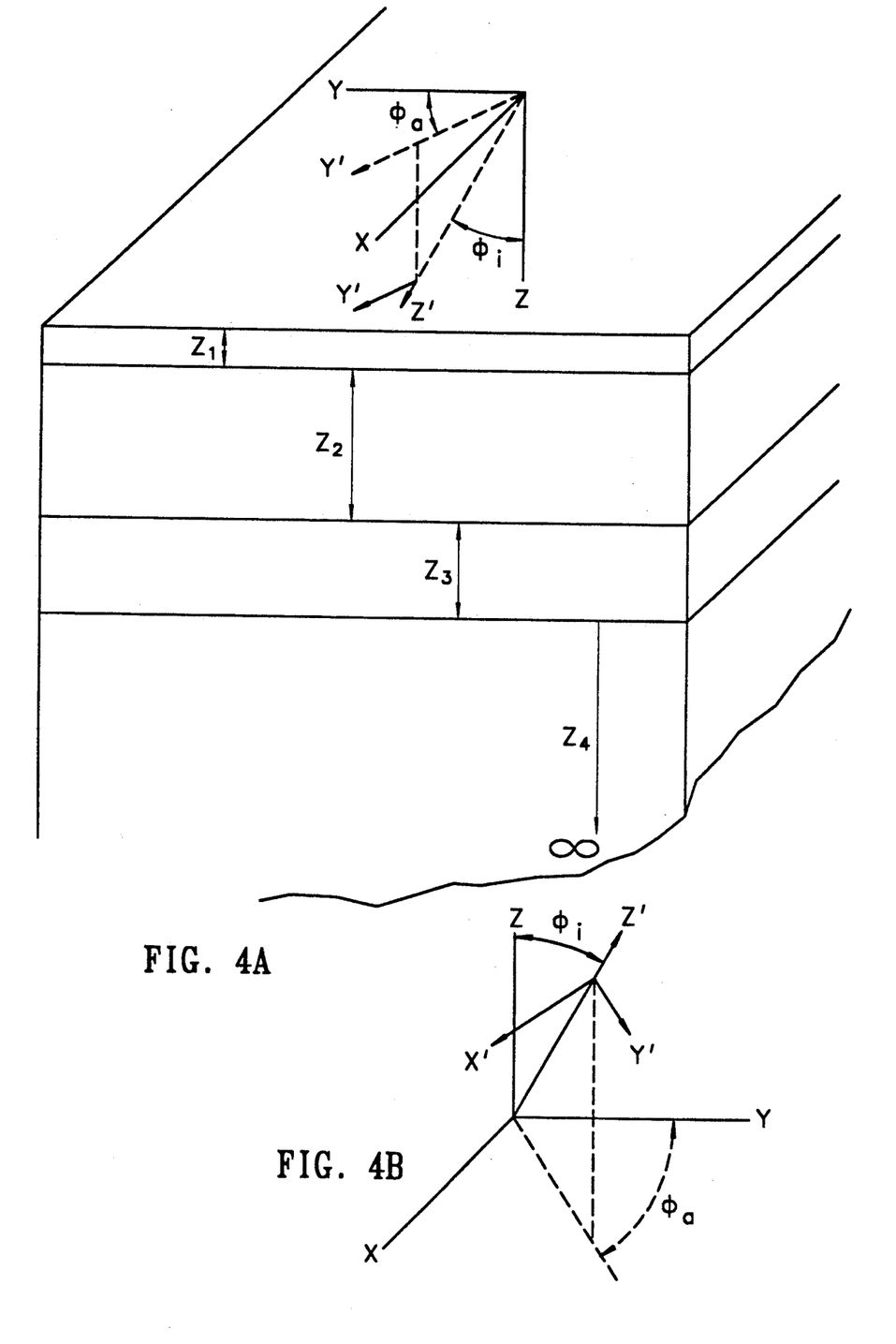
FIGS. 4a and 4b depict respectively, a section of the earth illustrating several vertically stacked horizontal layers whose physical and electrical properties can be determined by the method of the present invention, and the coordinate system used in the description of the method of the present invention.

FIG. 4a depicts a section of the earth and illustrates several vertically stacked horizontal layers whose physical and electrical properties (that is a geoelectric column) can be determined by the method of the present invention. FIG. 4b depicts the coordinate system shown in FIG. 4a in its usual upright orientation, for purposes of clarity. A system of transverse waves is to be constructed for this arbitrary set of horizons. The system can be constructed such that the waves are traveling in the vertical z-direction or tilted in an arbitrary direction such that the coordinate systems xyz and x'y'z' do not coincide. In FIGS. 4a and 4b, $\phi_i$ represents the deviation of the waves from the vertical z-direction, and $\phi_a$ represents the azimuth angle.

Using equation (1) as a solution of Maxwell's equations for one frequency component of a wave propagating through the earth, a boundary condition for the continuity of the tangential electric field at the boundaries of each layer $Z_1, Z_2, \ldots Z_k$ is imposed. Using methods known in the art, this leads to the development of a system of equations which can be solved to yield the electrical parameters of the layers.

If equation (1) is rewritten in the form:

$$E(\omega,D) = E(\omega,D) \exp(i\omega t - i\omega\eta D/c), \text{ where}$$
$$\eta = \alpha + i\beta,$$

then $\eta D$ can be written:

$$\eta D = x \sin\phi_i \sin\phi_a + y \sin\phi_i \cos\phi_a + z \zeta. \quad (7)$$

This form is particularly useful because, as will be seen, the quantity $\zeta$ is related to the electrical parameters of the layers. The equations which result from imposing the boundary condition for the continuity of the field across each boundary of the layers can be written in a compact form by defining the quantity $Q = E_x/E_y$. With this definition, the following set of equations is formed for the $E_x$ field ($\phi_a = \pi/2$), for the example of three layers:

$$E_{y'i}\cos\phi_i - E_{y'r}\cos\phi_i = Q_i^{(1)}E_{yi}^{(1)} + Q_r^{(1)}E_{yr}^{(1)}; \quad (8)$$

$$Q_i^{(1)}E_{yi}^{(1)}\exp[-i\omega z_1\zeta_i \\ + Q_r^{(1)}E_{yr}^{(1)}\exp[-i\omega z_1\zeta_r^{(1)}/c] = Q_i^{(2)}E_{yi}^{(2)} + Q_r^{(2)}E_{yr}^{(s)}; \text{ and}$$

$$Q_i^{(2)}E_{yi}^{(2)}\exp[-i\omega z_2\zeta_i^{(2)}/c] + Q_r^{(2)}E_{yr}^{(2)}\exp[-i\omega z_2\zeta_r^{(2)}/c] = Q_i^{(3)}E_{yi}^{(3)}.$$

In the above equations (8), the subscripts y' or y refer to the appropriate coordinate system, the subscripts i or r refer to either the downgoing wave or the upgoing (reflected) wave, respectively, and the numerical indices refer to the noted layers.

Equations similar to equations (8) above are produced for each layer in the model. The last (deepest) layer is usually assumed to be infinite so that no upgoing waves are present. A similar set of boundary conditions is also produced for the $E_y$ component of the electric field, and for the $H_x$, and $H_y$ components of the magnetic field. These equations are then reduced to the following system of equations:

$$\begin{matrix} a_{11} & a_{12} & a_{13} & & & & & & & R_m & a_{10} \\ a_{21} & a_{22} & a_{23} & & & & & & & U_{i1} & a_{20} \\ & a_{32} & a_{33} & a_{34} & a_{35} & & & & & U_{r1} & \\ & a_{42} & a_{43} & a_{44} & a_{45} & & & & & U_{i2} & = \\ & & & a_{54} & a_{55} & a_{56} & a_{57} & & & U_{r2} & \\ & & & a_{64} & a_{65} & a_{66} & a_{67} & & & U_{i3} & \\ & & & & & a_{76} & a_{77} & a_{78} & a_{79} & U_{r3} & \\ & & & & & a_{86} & a_{87} & a_{88} & a_{89} & U_{i4} & \\ & & & & & & \cdot & \cdot & \cdot & \cdot & \\ & & & & & & \cdot & \cdot & \cdot & \cdot & \\ \end{matrix} \quad (9)$$

where $U_{in}$ is proportional to the downgoing wave in the nth layer, $U_{rn}$ is proportional to the upgoing wave in the nth layer, and $R_m$ is the total reflection back to the receiving capacitors (the net reflection coefficient as measured at the surface). The system of equations shown in (9) is representative of a model having 4 layers. As mentioned, the last layer is assumed to be infinite and having no upgoing wave.

The terms in the above system of equations are:

$a_{10} = 1$         $a_{32} = \exp(-ik_0 z_1 \zeta_{i1})$   $a_{54} = \exp(-ik_0 z_2 \zeta_{i2})$
$a_{20} = -\cos(\phi_i)$  $a_{33} = \exp(-ik_0 z_1 \zeta_{r1})$   $a_{55} = \exp(-ik_0 z_2 \zeta_{r2})$
$a_{11} = -1$        $a_{34} = -1$                         $a_{56} = -1$
$a_{12} = -1$        $a_{35} = -1$                         $a_{57} = -1$
$a_{13} = -1$        $a_{42} = \zeta_{i1}\exp(-ik_0 z_1 \zeta_{i1})$  $a_{64} = \zeta_{i2}\exp(-ik_0 z_2 \zeta_{i2})$
$a_{21} = -\cos(\phi_i)$  $a_{43} = \zeta_{r1}\exp(-ik_0 z_1 \zeta_{r1})$  $a_{65} = \zeta_{r2}\exp(-ik_0 z_2 \zeta_{r2})$
$a_{22} = \zeta_{i1}$      $a_{44} = \zeta_{i2}$                   $a_{66} = \zeta_{i3}$
$a_{23} = \zeta_{r1}$      $a_{45} = \zeta_{r2}$                   $a_{67} = \zeta_{r3}$, where $\zeta$ is as defined in equation (7) and can be expressed as $\eta^2 = \zeta^2 + \sin^2(\phi_i)$ with $\phi_a = \pi/2$.

The wave system traveling in the downward, z-direction in FIG. 4a (the $E_i$ waves) gives rise to upgoing waves in the negative z-direction (the $E_r$ waves) as a consequence of the change in electrical characteristics at the boundaries of layers z1, z2, z3 ... such that $E_i$, the incident wave into the earth at the top layer, and $E_r$, the net upgoing wave at the top layer are related by:

$$E_r = E_i R_m \quad (10)$$

where $R_m$ is as defined above.

The solution for the total reflected or $E_r$ wave depends on $R_m$, which can be written:

$$R_m = (R_{m,0} - T_1)(1 - R_{m,0} T_1) \quad (11)$$

where, $$R_{m,0} = [\cos(\phi_i) - \zeta_{i1}]/[\cos(\phi_i) + \zeta_{i1}] \quad (12)$$

$$T_1 = \exp(-2k_0 z_1 \zeta_{i1})(1 - R_1 T_2)/(T_2 - R_1) \quad (13)$$

$$R_1 = (1 - \zeta_{i2}/\zeta_{i1})/(1 + \zeta_{i2}/\zeta_{i1}) \quad (14)$$

$$T_2 = \exp(-2k_0 z_2 \zeta_{i2})(1 - R_2 T_3)/(T_3 - R_2) \quad (15)$$

$$R_2 = (1 - \zeta_{i3}/\zeta_{i2})/(1 + \zeta_{i3}/\zeta_{i2}) \quad (16)$$

...
...

$$R_{N-1} = (1 - \zeta_N/\zeta_{N-1})/(1 + \zeta_N/\zeta_{N-1}) \quad (17)$$
$$T_N = 0$$

$$T_{N-1} = \exp(-2ik_0 z_{N-1} \zeta_{(N-1)})/R_{N-1} \quad (18)$$

The number N is the number of horizons in the model of that region of the earth. The above equations thus provide a recursive method of determining the quantities $R_N$ and $T_N$.

The transmission into the earth is determined by the complex quantities $U_{in}$ and $U_{rn}$, which are transmission coefficients for downgoing (i) or upgoing (r) waves into or from the layer specified by the index n. These waves can be calculated from the matrix equation (9), which, after considerable manipulation can be reduced to the following:

$$R_m = (R_0 - T_1)/(1 - R_0 T_1) \quad (19)$$

$$U_{i1} = U_0/(1 - R_0 T_1) \quad (20)$$

$$U_{r1} = U_0 T_1/(1 - R_0 T_1) \quad (21)$$

$$U_{i2} = U_0 U_{01} R_1/[(1 - R_0 T_1)(R_1 - T_2)] \quad (22)$$

$$U_{r2} = U_0 U_{01} R_1 T_2/[(1 - R_0 T_1)(R_1 - T_2)] \quad (23)$$

$$U_{i3} = U_0 U_{01} U_{02} R_1 R_2/[(1 - R_0 T_1)(R_1 - T_2)(R_2 - T_3)] \quad (24)$$

$$U_{r3} = U_0 U_{01} U_{02} R_1 R_2 T_3 / [(1 - R_0 T_1)(R_1 - T_2)(R_2 - T_3)] \quad (25)$$

$$U_{in} = (U_0 U_{01} U_{02} \ldots U_{0(n-1)})(R_1 R_2 \ldots R_{(n-1)})/ \quad (26)$$
$$[(1 - R_0 T_1)(R_1 - T_2) \ldots (R_{(n-1)} - T_n)]$$

where $T_n = 0$ for $n = N$, if N horizons exist. Based upon these definitions:

$$U_0 = -2\cos(\phi_i)/[\cos(\phi_i) - \zeta_{i1}] \quad (27)$$

$$U_{01} = 2\exp(-ik_0 z_1 \zeta_{i1})/(1 - \zeta_{i2}/\zeta_{i1}) \quad (28)$$

$$U_{02} = 2\exp(-ik_0 z_2 \zeta_{i2})/(1 - \zeta_{i3}/\zeta_{i2}) \quad (29)$$

...
...

The above expressions (20 to 29) completely describe the earth model electric field at any point below the surface of the earth. The particular filter of importance to the recovery of the geoelectric column requires:

$$\phi_i = 0 \quad (30)$$

This value of $\phi_i$ has the effect of filtering out the non-vertically traveling waves (see FIG. 4a) by making the vertical direction perpendicular to the wavefronts.

It is now desired to solve equation (1) for the frequency domain model signal for the ratio, $W_1$, of the amplitudes of the upgoing (r) to the downgoing (i) waves at the earth's surface (i.e., $R_m$):

$$E_r(\omega)/E_i(\omega) = W_1 \quad (31)$$

Now define:

$$A_n = \exp(2ik_0 z_n \zeta_n)/R_n \quad (32)$$

$$E_n = \exp(2ik_0 z_n \zeta_n) \quad (33)$$

$$R_n = (1 - \zeta_{(n+1)}/\zeta_n)/(1 + \zeta_{(n+1)}/\zeta_n) \quad (34)$$

where $R_n$ is the reflection coefficient at the top of the nth layer, and then proceed to calculate the ratios $W_N$, where $W_N$ is the ratio of the upgoing to downgoing waves at the Nth layer, as follows:

$$W_{(N-1)} = \frac{1 - A_{(n-1)} R_{(N-2)}}{A_{(N-1)} - R_{(N-2)}} \cdot E_{(N-2)} \quad (35)$$

$$W_{(N-2)} = \frac{1 - W_{(N-1)} R_{(N-3)}}{W_{(N-1)} - R_{(N-3)}} \cdot E_{(N-3)} \quad (36)$$

$$W_{(N-3)} = \frac{1 - W_{(N-2)} R_{(N-4)}}{W_{(N-2)} - R_{(N-4)}} \cdot E_{(N-4)} \quad (37)$$

$$W_n = \frac{1 - W_{(n+1)}R_{(n+3)}}{W_{(n+1)} - R_{(n+3)}} \cdot E_{(n+3)} \quad (38)$$

...

until n=1.

The spectral relation between time, t and depth D can be established as follows:

$$\Psi_n^{ns} = \frac{2(10)^9}{c} \sum_{k=1}^{n} z_k \zeta_k \quad (39)$$

$$\frac{\delta D_k}{\delta \Psi_k} = \frac{D_k - D_{(k-1)}}{\Psi_k - \Psi_{(k-1)}} \quad (40)$$

$$D_p^{ft} = \left[ \sum_{k=1}^{n} 2z_k + (t_p - \Psi_p) \cdot \frac{\delta D_n}{\delta \Psi_n} \right] \cdot 1.641 \quad (41)$$

where $\Psi_n^{ns}$ is the propagation time in nanoseconds for a wave traveling into layer n, and $D_p^{ft}$ is the depth in feet calculated at the time $t_p$(ns). This relationship allows the depth at which a layer is located to be correlated with a time or time window in which a return pulse is detected. The depth estimated by this method will vary somewhat with the frequency used. The actual depth of a layer is an output of the model after its final iteration.

The method of the present invention is performed on waves having a set of frequency components in the frequency domain which correspond to the selected time window in the time domain. The relationship between time and depth is related to the frequencies in the frequency window and can be estimated from equation (41). In practical terms, an initial time window is selected and the depth regime corresponding to that window is determined, typically at a frequency of 1 MHz. This correspondence can then be checked at another frequency, for example 10 MHz. Further, the initial depth regime can be associated with a number of layers, each with specified values for the physical and electrical parameters.

To facilitate calculations, the inner integral of equation (5) can be written compactly as follows:

$$E(\omega) = TE(t) \quad (42)$$

Now let:

$$F(\omega) = Ln[[E(\omega)exp(i\omega t)]^*[E(\omega)exp(i\omega t)]] \quad (43)$$

where the first factor in equation (43) is the complex conjugate of the second factor. Then the outer integral of equation (5) can be regarded as the inverse of equation (42):

$$E_S(t) = T^{-1}F(\omega) \quad (44)$$

Setting $E_S(t)=0$ when $t<0$ gives:

$$E_S(\omega) = TE_S(t) \quad (45)$$

whereupon the desired spectrum normalization filter becomes:

$$W_S(\omega) = 1/\exp[E_S(\omega)] \quad (46)$$

The normalization filter tends to give more equal weight to the various discrete spectral components in the selected frequency window. The replication in the time domain is then as follows:

$$E(t) = T^{-1}E(\omega)W_S(\omega) \quad (47)$$

$$E(\omega) = \int_{-\infty}^{+\infty} u(t) \exp(-i\omega t) E(t) \, dt \quad (48)$$

where $u(t)=0$, $t>T_2$ $t<T_1$; else $u(t)=1$, which defines T.

Also, $$E(t) = (1/2\pi) \int_{-\infty}^{+\infty} v(\omega) \exp(i\omega t) E(\omega) W_S(\omega) \, d\omega, \quad (49)$$

where $v(\omega)=1$, $-F_2>f<-F_1$; $F_1<f<F_2$; else $v(\omega)=0$, which defines $T^{-1}$. Thus, ordinary replication of the data implies $W_S=1$ while replication using normalized spectrum filtering, Ws is defined by equation (46). Furthermore, the time window is defined by T1 and T2 and the frequency window is defined by $F_1$ and $F_2$.

The preceding discussion has focused on the construction of the model input signal indicated by box 450 in FIG. 3 and the construction of the propagation model indicated by box 460 in the same figure. Application of the propagation model to the model input signal produces a model return signal. The model return signal is usually expressed in the frequency domain and may then be transformed to the time domain (yielding a return pulse time domain waveform) for purposes of comparison with actual observed data.

The adjustment of the propagation model so as to better replicate actual observed data is carried out by means of a correlation step, as indicated by box 470 in FIG. 3. The correlation step can be implemented by any suitable measure, such as that which will be described.

$E_1(t)$, the observed data, and $E_2(t)$, the predicted data, are compared as follows:

$$H = \frac{[\sum_{n=1}^{N} [E_1(t_n) - E_{1M}][E_2(t_n) - E_{2M}]}{\sqrt{[\sum_{n=1}^{N} [E_1(t_n) - E_{1M}]^2 \cdot [\sum_{n=1}^{N} [E_2(t_n) - E_{2M}]^2}} \times 100 \quad (50)$$

where, $E_{1M} = (1/N)\Sigma_{n=1}^{N} E_1(t_n)$ and $E_{2M} = (1/N)\Sigma_{n=1}^{N} E_2(t_n)$. Thus for N discrete values of time over the processed pulse waveform, H is calculated as a value ($-100<H<+100$) that is sought to be maximized by the iterative process described by boxes 460, 470, 480, and 490 of FIG. 3. Note that equation (50) is a form of a linear correlation factor. Other correlation methods may also be utilized.

The parameter adjustment in step 480 of FIG. 3 is based on perturbations of the conductivity, the dielectric property and the layer thickness together with the layer density, i.e., the number of horizons, N. The perturbations of the physical and electrical parameters can be carried out by any of several means. A preferred technique used by the inventor of the present invention is to alter the parameter values by a fixed percentage, and then increase or decrease that percentage (and the direction of the parameter change, i.e., increase in value or decrease) based on the outcome of subsequent correlation results, i.e., the value of H in equation (50).

The iterative process depicted in FIG. 3 continues until the desired degree of correlation between the actual data and the response pulse predicted by the propagation model is obtained. This usually corresponds to a correlation of between 75% and 99%, i.e., a value of H between 75 and 99. At that point the iterative loop is terminated as shown in box 500 of FIG. 3. The physical and electrical parameters of the propagation model which produced the desired degree of correlation describe the geoelectric column for that section of the earth's interior, as indicated by box 510 of FIG. 3.

As previously mentioned, the basic electrical parameters of conductivity, dielectric and resistivity are subject to a frequency dependence in the frequency window used in the method of the present invention. For example, the conductivity in the frequency window is related to the zero frequency conductivity by the quantity:

$$\Delta\sigma_k = \sigma_k(f_{ref}) - \sigma_{Ks} \tag{51}$$

The reference frequency conductivity in the frequency window is differenced from the zero frequency conductivity to determine the amount of conductivity subject to frequency dependence. The zero frequency conductivity can be determined in various ways, according to methods known in the art. The reference frequency best adapted to the purposes of the present invention is 1 MHz. As an example, quoted values for the zero frequency conductivity of sandstone are (1/322) that of the total conductivity. The loss tangent, Lt, is calculated as follows:

$$Lt_k = \frac{\sigma_k}{\epsilon_k \epsilon_0 \omega} \tag{52}$$

The complex resistivity then becomes:

$$\rho_k = \rho_k^{re} - i\rho_k^{im} \tag{53}$$

where the real, re, and the imaginary, im, parts are:

$$\rho_k^{re} = \frac{Lt_k}{\epsilon_k \epsilon_0 \omega (1 + Lt_k^2)} \tag{54}$$

$$\rho_k^{im} = \frac{\rho_k^{re}}{Lt_k} \tag{55}$$

Now let:

$$F_s = \frac{(\omega\tau)^\alpha \sin\left(\frac{\alpha\pi}{2}\right)\epsilon_0\omega}{\left[1 + 2(\omega\tau)^\alpha \cos\left(\frac{\alpha\pi}{2}\right) + (\omega\tau)^{2\alpha}\right]} \tag{56}$$

and:

$$F_c = \frac{1 + (\omega\tau)^\alpha \cos\left(\frac{\alpha\pi}{2}\right)}{\left[1 + 2(\omega\tau)^\alpha \cos\left(\frac{\alpha\pi}{2}\right) + (\omega\tau)^{2\alpha}\right]} \tag{57}$$

whereupon:

$$\epsilon_{ks} = \epsilon_k + \Delta\sigma_k\left(\frac{1 - F_c}{F_s}\right) \tag{58}$$

and:

$$\epsilon_{k\infty} = \epsilon_k - \left(\frac{F_c}{F_s}\right)\Delta\sigma_k \tag{59}$$

if equations (58 and 59) are calculated at the reference frequency. At all other frequencies in the spectrum the following electrical parameters can be calculated:

$$\sigma_k = \sigma_{ks} + \frac{(\epsilon_{ks} - \epsilon_{k\infty})(\omega\tau)^\alpha \sin\left(\frac{\alpha\pi}{2}\right)\epsilon_0\omega}{\left[1 + 2(\omega\tau)^\alpha \cos\left(\frac{\alpha\pi}{2}\right) + (\omega\tau)^{2\alpha}\right]} \tag{60}$$

$$\epsilon_k = \epsilon_{k\infty} + \frac{(\epsilon_{ks} - \epsilon_{k\infty})\left[1 + (\omega\tau)^\alpha \cos\left(\frac{\alpha\pi}{2}\right)\right]}{\left[1 + 2(\omega\tau)^\alpha \cos\left(\frac{\alpha\pi}{2}\right) + (\omega\tau)^{2\alpha}\right]} \tag{61}$$

In these formulas, $\alpha = \alpha_k$ and $\tau = \tau_k$ for each stratum, which is designated by the index k.

In summary, the following physical and electrical parameters are subject to adjustment for each stratum, k, in the filter parameter adjustment loop 490 of FIG. 3:

$$\sigma_k, \epsilon_k, Z_k, \alpha_k, \tau_k, \sigma_{ks}$$

The complex resistivity, $$\rho_k^{re} - i\rho_k^{im},$$

is determined by equations (52), (53), (54), and (55), which gives the profile of each parameter as a function of depth, D. The frequency dependence is given by equations (56), (57), (58), and (59). Finally, the physical size and location of each of these electrical entities is given by:

$$Z_k = Z_1, Z_2, Z_3 \ldots$$

The relation between depth, D and time along the observed or the predicted waveform is given by equations (39), (40), and (41).

As discussed previously, the propagation or earth electrical model can be excited with a model input pulse, as indicated by the inner integral of equation (5). If, for example, $F_S(\tau)$ is defined to be an impulse function, then:

$$\int_0^\infty \exp(-i\omega\tau)F_S(\tau)d\tau = \int_0^\infty \exp(-i\omega\tau)\delta(\tau)d\tau = 1 \tag{62}$$

The inventor of the present invention has found that better results can be obtained if a more realistic pulse, such as a square wave, is used:

$$\int_0^\infty \exp(-i\omega\tau)F_S(\tau)d\tau = \int_0^\infty \exp(-i\omega\tau)u(\tau)d\tau \tag{63}$$

where, $u(\tau)=1$ $(T_1<\tau<T_2)$; else $u(\tau)=0$. In addition, the value of $T_2-T_1$ may be set to a desired amount, for example 5ns. Further waveform adjustment can be made with a filter such as:

$$f(\omega) = \frac{-iA_n\omega}{A_0 - \omega^2 - iA_n\omega} \tag{64}$$

where for example $A_n=2.08(10)^7$ and $A_o=2.5(10)^{13}$.

The preceding discussion of the method of the present invention has focused on obtaining the physical and electrical parameters corresponding to one layer or set of layers beneath the earth's surface. After these parameters have been determined to the desired degree of precision (based on the degree of correlation between the actual data and the modeled data), the iterative process is performed again with actual data obtained from a new time window. Since the new time window corresponds to a different depth regime in the earth, a progression of data from different time windows can be used to validate the results of the model for multiple layers, eventually producing a complete geoelectric column model for a location.

In accordance with the present invention, there is presented a method for determining the physical and electrical parameters corresponding to the subsurface regions beneath a location on the earth's surface. An earth capacitor apparatus is used to inject a pulse into the earth's surface. The pulse propagates into the earth, resulting in a return pulse which is detected and stored. The actual return pulse data is then used to validate parameters selected for a propagation model of the subsurface regions.

The propagation model treats the earth's interior as a set of vertically stacked horizontal layers, each characterized by a depth, thickness, complex conductivity (or resistivity), and relative dielectric constant. A model input pulse is used to represent the injected pulse, and the propagation model is applied to the model pulse to produce simulated return pulse data. Comparison between the actual return pulse data from a specific time window (and hence an approximate depth regime) and the simulated return pulse data is used as the basis for adjusting the parameters of the propagation model.

The process is continued in an iterative fashion until a desired degree of correlation is obtained between the actual data and the simulated data. The process can then be extended to additional layers and/or locations until a model of the physical and electrical properties of the subsurface layers is established. This model can be used to assist with determining the type and character of subsurface geologic formations, thereby assisting with geophysical exploration.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

I claim:

1. A method for processing a return electromagnetic pulse that has propagated through a subterranean formation from a capacitor, including the steps of:
   (a) selecting an initial geoelectric column model which determines a set of filter coefficients indicative of one or more electromagnetic properties of a set of vertically stacked horizontal layers of the subterranean formation;
   (b) generating a simulated return pulse by applying the filter coefficients to a model input electromagnetic pulse, where the simulated return pulse represents response of the formation to application of the model input electromagnetic pulse; and
   (c) generating a modified geoelectric column model which results in increased correlation between the return electromagnetic pulse and a simulated return pulse predicted by the modified geoelectric column model, relative to correlation between the return electromagnetic pulse and a simulated return pulse predicted by the initial geoelectric column model.

2. A method for processing a return electromagnetic pulse that has propagated through a subterranean formation from a capacitor, including the steps of:
   (a) selecting a geoelectric column model, said model determining a set of filter coefficients indicative of properties of vertically stacked horizontal layers of the subterranean formation;
   (b) generating a simulated return pulse by applying the filter coefficients to a model input electromagnetic pulse, where the simulated return pulse represents a response of the formation, measured at a first location of the formation during a first time window after application of the model input electromagnetic pulse to the first location;
   (c) correlating a detected portion of the return electromagnetic pulse with the simulated return pulse, wherein said detected portion of the return electromagnetic pulse is detected during the first time window after application of an input electromagnetic pulse to the formation;
   (d) generating a modified geoelectric column model defined by modified filter coefficients selected for increasing correlation during a subsequent repetition of step (c); and
   (e) repeating steps (b) through (d) using the modified filter coefficients in place of the filter coefficients, until a desired degree of correlation is achieved in the final repetition of step (c).

3. The method of claim 2, also including the step of:
   (f) applying the input electromagnetic pulse to the subterranean formation from a capacitor at said first location.

4. The method of claim 3, wherein step (f) includes the steps of:
   disposing capacitor plates having a largest dimension L in direct contact with the formation at said first location, to form an earth capacitor comprising the plates and a region of the formation near the plates; and
   applying a short voltage pulse across the capacitor plates to transmit the input electromagnetic pulse into the formation, wherein for each frequency component of the input electromagnetic pulse, the largest dimension L satisfies the relation $Re[k\cdot L]<1$, where k is the wavenumber in the formation of said frequency component, and further, wherein the short voltage pulse has frequency components in a broad band extending from below 1 MHz to above 100 MHz.

5. The method of claim 4, also including the steps of:
   detecting a return portion of the input electromagnetic pulse after said input electromagnetic pulse has propagated through the formation in response to application of the short voltage pulse, and wherein said portion of the return electromagnetic pulse processed in step (c) includes only frequency components of the detected return portion in a frequency window having an upper frequency less than 25 MHz.

6. The method of claim 2, also including the steps of:

(g) after step (e), selecting an expanded geoelectric column model comprising an expanded set of filter coefficients, said expanded set including the modified filter coefficients generated during the final repetition of step (d), and additional filter coefficients indicative of an additional layer of the subterranean formation;

(h) after step (g) repeating steps (b) through (e) using the expanded set of filter coefficients to generate a modified, expanded geoelectric column model.

7. The method of claim 2, also including the steps of:

(g) after step (e), repeating steps (b) through (e), with the simulated return pulse representing a response of the formation measured at the first location during a second time window after application of the model input electromagnetic pulse to the first location, and with the detected portion of the return electromagnetic pulse detected during the second time window after application of the input electromagnetic pulse to the formation.

8. The method of claim 2, wherein step (d) includes the step of applying a spectrum normalizing filter to the modified filter coefficients, and wherein step (c) includes the step of applying a spectrum normalizing filter to the detected portion of the return electromagnetic pulse before correlating said detected portion of the return electromagnetic pulse with the simulated return pulse.

9. The method of claim 2, also including the step of:
determining a resistivity model from the modified geoelectric column model determined during the final repetition of step (d), said resistivity model determining a resistivity of each of the vertically stacked horizontal layers.

10. The method of claim 2, also including the step of:
determining a dielectric coefficient model from the modified geoelectric column model determined during the final repetition of step (d), said dielectric coefficient model determining a dielectric coefficient of each of the vertically stacked horizontal layers.

11. The method of claim 2, also including the step of:
determining an electrical property of each of said vertically stacked horizontal layers as a function of frequency, from the modified geoelectric column model determined during the final repetition of step (d).

12. A method for determining electromagnetic properties of a subterranean formation, including the steps of:

(a) transmitting an electromagnetic pulse into the formation by disposing capacitor plates having a largest dimension L, in direct contact with the earth formation to form an earth capacitor comprising the plates and a region of the earth formation near the plates, and applying a short voltage pulse across the capacitor plates to transmit electromagnetic radiation into the earth formation, wherein for each frequency component of the electromagnetic radiation, the largest dimension L satisfies the relation $Re[kL] < 1$, where k is the wavenumber in the earth formation of said frequency component, and further, wherein the short voltage pulse has frequency components in a broad band extending from below 1 MHz to above 100 MHz;

(b) detecting a return electromagnetic pulse that has propagated through the earth formation in response to application of the short voltage pulse; and (c) processing only frequency components of the return electromagnetic pulse, in a frequency window having an upper frequency less than 25 MHz, which have propagated into the earth formation to a penetration depth much greater than on the order of several hundred feet, to determine a geoelectric column model which determines one or more electromagnetic properties of a set of vertical layers of the formation.

13. The method of claim 12, wherein step (c) includes the steps of:

selecting an initial geoelectric column model which determines a set of filter coefficients indicative of one or more electromagnetic properties of a set of vertically stacked horizontal layers of the formation;

generating a simulated return pulse by applying the filter coefficients to a model input electromagnetic pulse, where the simulated return pulse represents response of the formation to application of the model input electromagnetic pulse; and generating a modified geoelectric column model which results in increased correlation between said frequency components of the return electromagnetic pulse and a simulated return pulse predicted by the modified geoelectric column model, relative to correlation between said frequency components of the return electromagnetic pulse and a simulated return pulse predicted by the initial geoelectric column model, and identifying said modified geoelectric column model as said geoelectric column model.

* * * * *